(12) United States Patent
Shimizu et al.

(10) Patent No.: US 11,148,326 B2
(45) Date of Patent: Oct. 19, 2021

(54) FLEXIBLE MANDREL AND METHOD OF MANUFACTURING COMPOSITE MATERIAL PART

(71) Applicant: MITSUBISHI HEAVY INDUSTRIES, LTD., Tokyo (JP)

(72) Inventors: Takayuki Shimizu, Tokyo (JP); Akihisa Okuda, Tokyo (JP); Ryota Ozaki, Tokyo (JP); Shoya Mano, Tokyo (JP); Masahiko Shimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 58 days.

(21) Appl. No.: 16/623,218

(22) PCT Filed: Jun. 7, 2018

(86) PCT No.: PCT/JP2018/021826
§ 371 (c)(1),
(2) Date: Dec. 16, 2019

(87) PCT Pub. No.: WO2019/026418
PCT Pub. Date: Feb. 7, 2019

(65) Prior Publication Data
US 2020/0198188 A1 Jun. 25, 2020

(30) Foreign Application Priority Data
Aug. 3, 2017 (JP) .............................. JP2017-150649

(51) Int. Cl.
*B29C 70/30* (2006.01)
*B29C 33/50* (2006.01)
(Continued)

(52) U.S. Cl.
CPC ............ *B29C 33/505* (2013.01); *B29C 70/30* (2013.01); *B29K 2105/0872* (2013.01); *B29K 2307/04* (2013.01); *B29L 2031/3076* (2013.01)

(58) Field of Classification Search
None
See application file for complete search history.

(56) References Cited

U.S. PATENT DOCUMENTS 5,502,886 A * 4/1996 Jensen ................ B29C 37/0003
                                              29/239
5,615,469 A    4/1997 Jensen et al.
(Continued)

FOREIGN PATENT DOCUMENTS

JP    H10-506329 A    6/1998
JP    H10-244598 A    9/1998
(Continued)

OTHER PUBLICATIONS

PCT, "International Search Report for International Application No. PCT/JP2018/021826," dated Aug. 21, 2018.
(Continued)

*Primary Examiner* — Jeffry H Aftergut
(74) *Attorney, Agent, or Firm* — Manabu Kanesaka; Benjamin Hauptman; Kenneth Berner

(57) ABSTRACT

A flexible mandrel for molding a composite material containing a thermosetting resin includes: a body including a contact surface configured to come into contact with the composite material during molding and a non-contact surface configured not to come into contact with the composite material during molding; and at least one hole formed from the non-contact surface toward an inside of the body.

10 Claims, 7 Drawing Sheets

(51) Int. Cl.
B29K 105/08 (2006.01)
B29K 307/04 (2006.01)
B29L 31/30 (2006.01)

(56) References Cited

U.S. PATENT DOCUMENTS

| | | | |
|---|---|---|---|
| 7,357,166 B2* | 4/2008 | Pham | B29C 70/345 |
| | | | 156/382 |
| 8,534,339 B2* | 9/2013 | Pham | B29C 33/76 |
| | | | 156/500 |
| 2006/0108057 A1 | 5/2006 | Pham et al. | |
| 2012/0219660 A1 | 8/2012 | Sana et al. | |
| 2012/0235336 A1 | 9/2012 | Sana et al. | |
| 2016/0129989 A1 | 5/2016 | Huddleston | |

FOREIGN PATENT DOCUMENTS

| | | |
|---|---|---|
| JP | 2008-521645 A | 6/2008 |
| WO | 2007/001447 A2 | 1/2007 |
| WO | 2011/033741 A1 | 3/2011 |
| WO | 2011/055524 A1 | 5/2011 |

OTHER PUBLICATIONS

PCT, "Written Opinion of the International Searching Authority for International Application No. PCT/JP2018/021826," dated Feb. 4, 2020.
Europe Patent Office, "Search Report for European Patent Application No. 18841948.5," dated May 4, 2020.

* cited by examiner

_US 11,148,326 B2_

FLEXIBLE MANDREL AND METHOD OF MANUFACTURING COMPOSITE MATERIAL PART

RELATED APPLICATIONS

The present application is National Phase of International Application No. PCT/JP2018/021826 filed Jun. 7, 2018, and claims priority from Japanese Application No. 2017-150649, filed Aug. 3, 2017, the disclosure of which is hereby incorporated by reference herein in its entirety.

TECHNICAL FIELD

The present disclosure relates to a flexible mandrel used for molding a composite material part including a composite material such as CFRP and a method of manufacturing a composite material part with the flexible mandrel.

BACKGROUND ART

Composite materials typified by carbon fiber reinforced plastic (CFRP) are excellent in strength and stiffness compared to typical metal materials, and are widely used for structures such as aircrafts and space machines with a need for reduced weight. CFRP mainly uses a thermosetting resin such as epoxy resin, and is molded by thermally curing the composite material in a chamber called an autoclave at high temperature and high pressure.

One example of the composite material part is a stringer for reinforcing a plate member used in an aircraft. The stringer has a complex shape including contours and twists in accordance with airframe designs, for example, I-type cross-sectional shape. Such a stringer is molded by stacking semi-cured flexible CFRP sheets (composite material) between a pair of mold mandrels, surrounding the assembly by a vacuum bag and eliminating air therein to bring the composite material into close contact with the mandrels, and subjecting the composite material to thermal curing treatment.

Patent Document 1 discloses a metal mandrel used for producing such a stringer, in which slots are formed in a depth direction to improve flexibility and generate complex shapes (contours and twists).

CITATION LIST

Patent Literature

Patent Document 1: JP4896035B

SUMMARY

Problems to be Solved

The mandrel used for molding a composite material containing a thermosetting resin as disclose in Patent Document 1 has a higher heat capacity than the composite material to be molded. Accordingly, it takes a long time to sufficiently raise the temperature for thermally curing the composite material to be molded, which leads to a reduction in part production rate and an increase in power consumed for thermal curing treatment, resulting in increased cost.

At least one embodiment of the present invention was made in view of the above circumstances, and an object thereof is to provide a flexible mandrel and a method of manufacturing a composite material part that can improve the part production rate and reduce the cost by promoting temperature rising for thermally curing a composite material containing a thermosetting resin.

Solution to the Problems (1) To solve the above problems, a flexible mandrel for molding a composite material containing a thermosetting resin according to at least one embodiment of the present invention comprises: a body including a contact surface configured to come into contact with the composite material during molding and a non-contact surface configured not to come into contact with the composite material during molding; and at least one hole formed from the non-contact surface toward an inside of the body.

With the above configuration (1), at least one hole is provided in the body of the flexible mandrel. By providing the hole, it is possible to reduce the heat capacity of the flexible mandrel. Further, since the hole is formed in the non-contact surface which does not come into contact with the composite material during molding, contact between the composite material and the contact surface is well ensured. Thus, it is possible to effectively reduce the time required for raising the temperature in thermal curing treatment, and it is possible to improve the part production rate and reduce the cost.

(2) In some embodiments, in the above configuration (1), the at least one hole is formed in a portion of the non-contact surface opposite to the contact surface.

With the above configuration (2), since the hole is formed in a portion of the non-contact surface opposite to the contact surface, contact between the composite material and the contact surface is well ensured.

(3) In some embodiments, in the above configuration (1) or (2), the at least one hole includes a plurality of holes uniformly formed in at least one region on the non-contact surface.

With the above configuration (3), in the region where the holes are uniformly distributed, since the heat capacity is reduced by a certain proportion over the entire region, it is possible to uniformly supply heat to the composite material during thermal curing treatment, and it is possible to mold the composite material with high quality.

(4) In some embodiments, in the above configuration (1) or (2), the at least one hole includes a plurality of holes non-uniformly formed in at least one region on the non-contact surface.

With the above configuration (4), the holes may be distributed non-uniformly in at least one region so that predetermined temperature distribution and stress are applied to the composite material when the flexible mandrel is transformed in accordance with the shape of the target. Thereby, it is possible to perform thermal curing treatment in accordance with the shape of the composite material at the time of thermal curing treatment, and it is possible to manufacture the composite material part with high quality.

(5) In some embodiments, in any one of the above configurations (1) to (4), the at least one hole is formed in the non-contact surface except for a non-formation region including an edge.

With the above configuration (5), by providing the non-formation region, where no hole is formed, in the vicinity of the edge, it is possible to obtain sufficient strength while ensuring flexibility of the mandrel. Thus, it is possible to favorably prevent damage in molding.

(6) In some embodiments, in the above configuration (5), the non-formation region has a thickness of 10% or more of a total thickness of the non-contact surface in a thickness direction along a plane perpendicular to a longitudinal direction of a composite material part made of the composite material.

With the above configuration (6), by setting the non-formation region having no hole in this range, it is possible to obtain sufficient strength while ensuring flexibility of the mandrel.

(7) In some embodiments, in any one of the above configurations (1) to (6), the at least one hole is a bottomed hole having a depth of 60% to 90% of a distance between the contact surface and the non-contact surface.

With the above configuration (7), by setting the depth of the hole in this range, it is possible to obtain appropriate flexibility and strength while precisely reducing the heat capacity of the flexible mandrel.

(8) In some embodiments, in any one of the above configurations (1) to (7), the flexible mandrel further comprises a filler filled in the at least one hole.

With the above configuration (8), by filling the hole with the filler, it is possible to flatten the non-contact surface having the hole. Thereby, for instance, when vacuum bag treatment is performed in thermal curing treatment, it is possible to prevent the bag material being drawn into the hole and damaged.

(9) In some embodiments, in the above configuration (8), the filler has a thermal conductivity higher than the body.

With the above configuration (9), by using a material having higher thermal conductivity than the body as the filler, it is possible to further improve the thermal conductivity of the flexible mandrel and more rapidly raise the temperature.

(10) In some embodiments, in the above configuration (8) or (9), the filler is a metal foam.

With the above configuration (10), as the filler, a lightweight metal foam excellent in heat conductivity such as aluminum foam is used.

(11) To solve the above problems, a method of manufacturing a composite material part by molding a composite material containing a thermosetting resin with a pair of flexible mandrels according to at least one embodiment of the present invention comprises: a step of forming a body of each flexible mandrel including a contact surface configured to come into contact with the composite material and a non-contact surface configured not to come into contact with the composite material; a step of forming at least one hole in the non-contact surface of the body toward an inside of the body; and a step of placing the composite material between the pair of flexible mandrels having the at least one hole and subjecting the composite material to thermal curing treatment.

With the above method (11), by using the flexible mandrel (including various embodiments described above), it is possible to promote temperature rising for thermally curing the composite material containing a thermosetting resin.

Advantageous Effects

According to at least one embodiment of the present invention, there is provided a flexible mandrel and a method of manufacturing a composite material part that can improve the part production rate and reduce the cost by promoting temperature rising for thermally curing a composite material containing a thermosetting resin.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The following embodiments will be described in conjunction with a case where the composite material is a carbon fiber reinforced plastic (CFRP) composed of carbon fiber reinforced with resin, containing a thermosetting resin such as epoxy resin, unsaturated polyester, vinyl ester, phenol, cyanate ester, or polyimide, which can be molded by thermal curing treatment.

As the reinforcing fiber of the composite material, besides carbon fiber, glass fiber, boron fiber, or aramid fiber can also be used.

Further, in the following embodiments, a stringer for reinforcing a plate member used in an aircraft is mentioned as an example of the composite material part obtained by molding the composite material. However, the present disclosure can be applied to various parts within a range of technical ideas. In particular, it can be applied to structures such as aircrafts and space machines with a need for strength, stiffness, and reduced weight.

(Flexible Mandrel)

Figure 1:
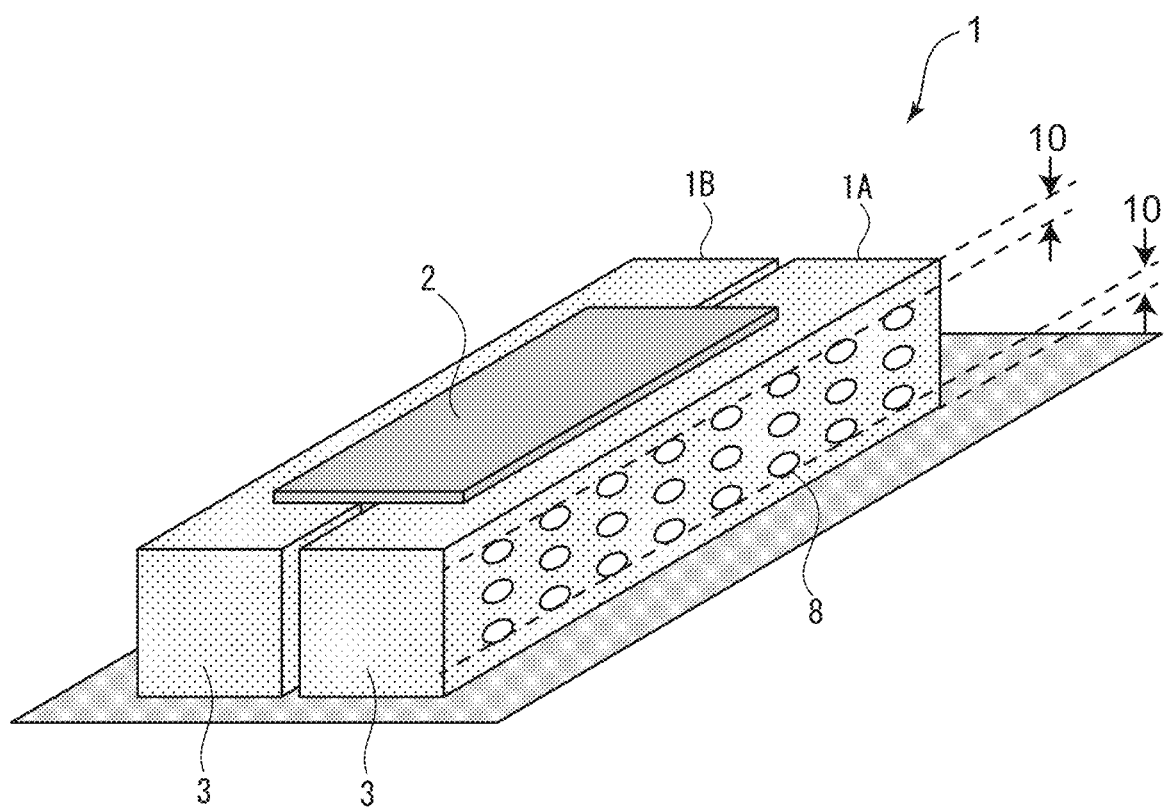
FIG. 1 is a perspective view of a flexible mandrel according to at least one embodiment of the present invention.
Figure 2:
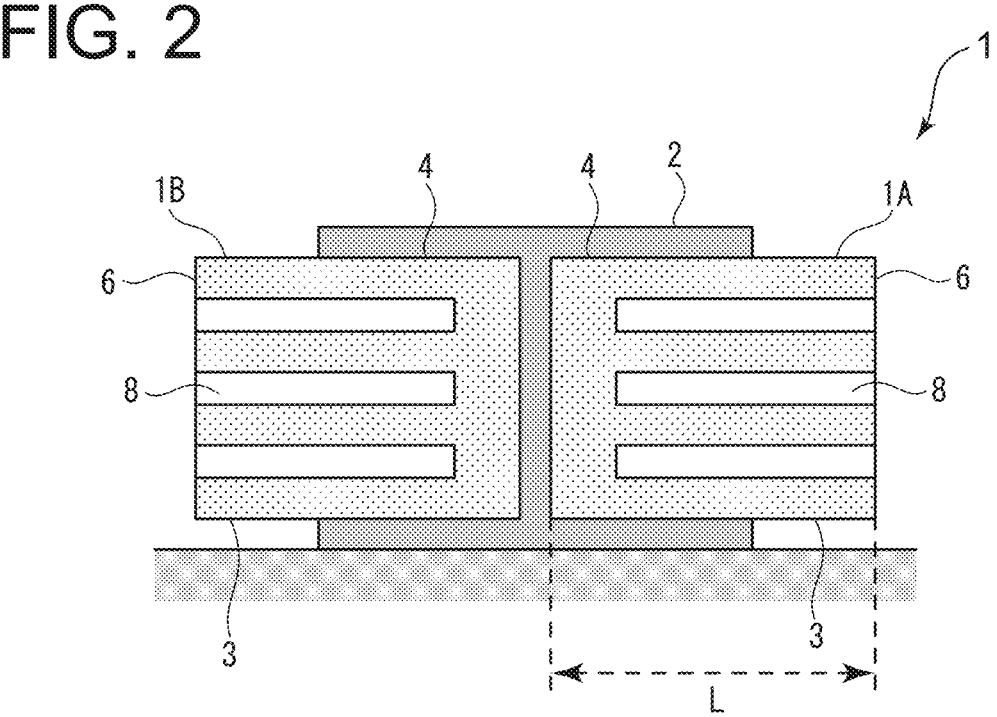
FIG. 2 is a cross-sectional view of FIG. 1.

First, a configuration of a flexible mandrel used for molding a composite material part will be described. FIG. 1 is a perspective view of a flexible mandrel 1 according to at least one embodiment of the present invention. FIG. 2 is a modification of FIG. 1. In FIGS. 1 and 2, a pair of flexible mandrels 1 (hereinafter, also separately referred to as "first flexible mandrel 1A" and "second flexible mandrel 1B") having the same shape and a composite material part 2 to be molded are depicted.

The flexible mandrel 1 is a mold for molding the composite material part 2 and has a shape in conformance with the composite material part 2 to be molded. In the present embodiment, an aircraft stringer having a I-type cross-section and extending in the longitudinal direction is shown as an example of the composite material part 2. The first flexible mandrel 1A and the second flexible mandrel 1B have the same shape. In FIG. 1, a composite material for forming the composite material part 2 is placed between these mandrels and molded.

A body 3 of the flexible mandrel 1 has a substantially square cross-sectional shape. The body 3 includes a thermally conductive material for transferring heat from the outside to the composite material part 2 to perform thermal curing treatment. The material of the body 3 has flexibility allowing the body 3 to transform in accordance with the designed shape of the composite material part 2. Examples of the material used in the flexible mandrel 1 include metal, plastic, and composite materials (CFRP, particularly preferably PAN-based CFRP in terms of cost; and PITCH-based CFRP can also be used).

As shown in FIG. 2, for molding the composite material part 2, the body 3 of the flexible mandrel 1 includes a contact surface 4 configured to come into contact with the composite material part 2 and a non-contact surface 6 configured not to come into contact with the composite material part 2. As described above, the contact surface 4 has a shape in conformance with the composite material part 2 to mold the composite material part 2, while the non-contact surface 6 may have any shape.

In this type of flexible mandrel, typically, a solid bulk material is used. In this case, however, since the heat capacity of the flexible mandrel is larger than that of the composite material part 2 to be molded, the time for raising the temperature in thermal curing treatment increases, which hinders the part production rate and the reduction in cost. In particular, if the body is made of a metal material, the body is heavy and thus is difficult to handle.

To solve such problems, the flexible mandrel 1 according to the present embodiment includes at least one hole 8. The hole 8 is formed from the non-contact surface 6 toward the inside of the body 3 (i.e., The hole 8 opens to the non-contact surface 6), so that the hole 8 does not affect the shape of the composite material part 2. By providing the hole 8 in the body 3, it is possible to reduce the heat capacity of the flexible mandrel 1, and it is possible to reduce the temperature rise time in thermal curing treatment. Further, since the hole 8 is formed in the non-contact surface 6 which does not come into contact with the composite material part 2 during molding, contact between the contact surface 4 and the composite material part 2 is ensured, and heat can be well transferred to the composite material part 2.

The hole 8 in the present embodiment is formed as a non-through hole having a bottom. The hole 8 may have any depth, for instance, a depth of 60% to 90% of a distance L between the contact surface 4 and the non-contact surface 6. By setting the depth of the hole 8 in this range, it is possible to obtain appropriate flexibility and stiffness while precisely reducing the heat capacity of the flexible mandrel 1.

However, the hole 8 may be a through hole. In this case, two openings (inlet and outlet) of the hole 8 are both preferably located in the non-contact surface 6. Further, although the hole 8 in the present embodiment is substantially straight, the hole 8 may be curved along curve of the body 3, for instance.

In the present embodiment, a plurality of holes 8 is provided. By providing a plurality of holes 8, it is possible to effectively reduce the heat capacity while precisely ensuring flexibility and stiffness of the flexible mandrel 1, compared to the case where only a single hole 8 is provided.

Further, as shown in FIGS. 1 and 2, the plurality of holes 8 may be distributed uniformly in at least one region on the non-contact surface 6. In the region where the holes 8 are uniformly distributed, since the heat capacity is reduced by a certain proportion over the entire region, it is possible to uniformly supply heat to the composite material during thermal curing treatment, and it is possible to mold the composite material with high quality.

The holes 8 are formed in the non-contact surface 6 except for a non-formation region 10 including an edge of the body 3. By providing the non-formation region 10 in the vicinity of the edge on which stress is likely to concentrate during molding, it is possible to obtain sufficient strength while ensuring flexibility of the mandrel. Thus, it is possible to prevent damage in molding.

The non-formation region 10 may be formed with a thickness of, for instance, 10% or more of the total thickness of the non-contact surface 6 in a thickness direction along the plane perpendicular to the longitudinal direction of the composite material part 2. By setting the non-formation region 10 in this range, it is possible to more effectively obtain sufficient strength while ensuring flexibility of the mandrel.

Figure 3:
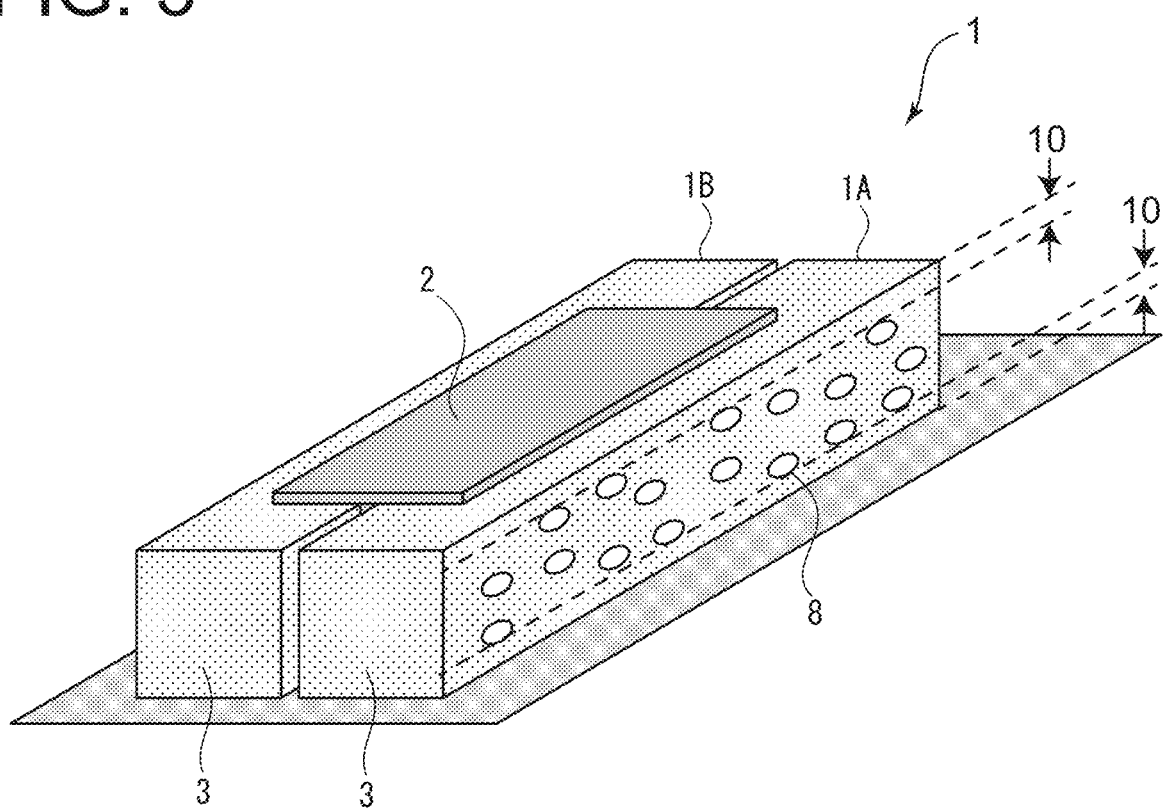
FIG. 3 shows a modification of FIG. 1.

FIG. 3 is a modification of FIG. 1. In this modification, the plurality of holes 8 is formed non-uniformly in at least one region on the non-contact surface 6. The distribution of such holes 8 may be random, or may be set in accordance with the shape of the composite material part 2 so that predetermined temperature distribution and stress distribution can be obtained when the flexible mandrel 1 is transformed in accordance with the shape of the composite material part 2. Thus, in thermal curing treatment, it is possible to control the amount of heat transferred to the composite material part 2, and it is possible to mold the composite material with high quality.

Figure 4:
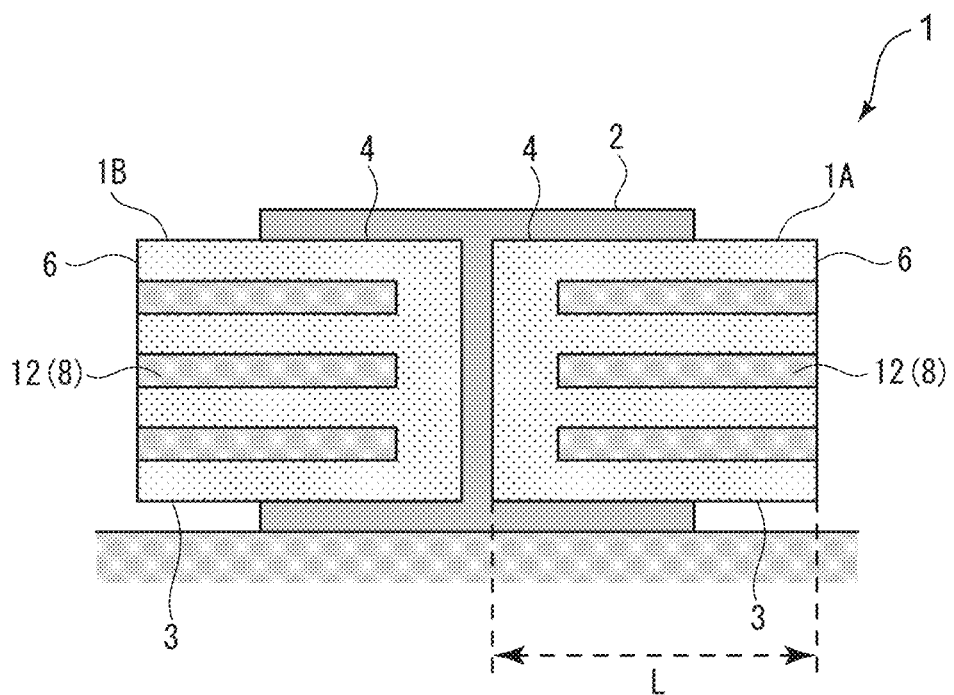
FIG. 4 shows a modification of FIG. 2.

FIG. 4 is a modification of FIG. 2. This modification further includes a filler 12 filled in the hole 8. By filling the hole 8 with the filler 12, it is possible to flatten the non-contact surface 6 having the hole 8. Thereby, for instance, when vacuum bag treatment is performed in thermal curing treatment, it is possible to prevent the bag material being drawn into the hole 8 and damaged (see step S5 of FIG. 5).

The filler 12 filled in the hole 8 may include a material having a thermal conductivity higher than the body 3. In this case, it is possible to further improve the thermal conductivity of the body 3 by the filler 12, and it is possible to more rapidly raise the temperature. As the material of the filler 12, a metal foam is useful, for instance. Specifically, a lightweight material excellent in thermal conductivity such as aluminum foam is preferably used.

(Method of Manufacturing Composition Material Part)

Figure 5:
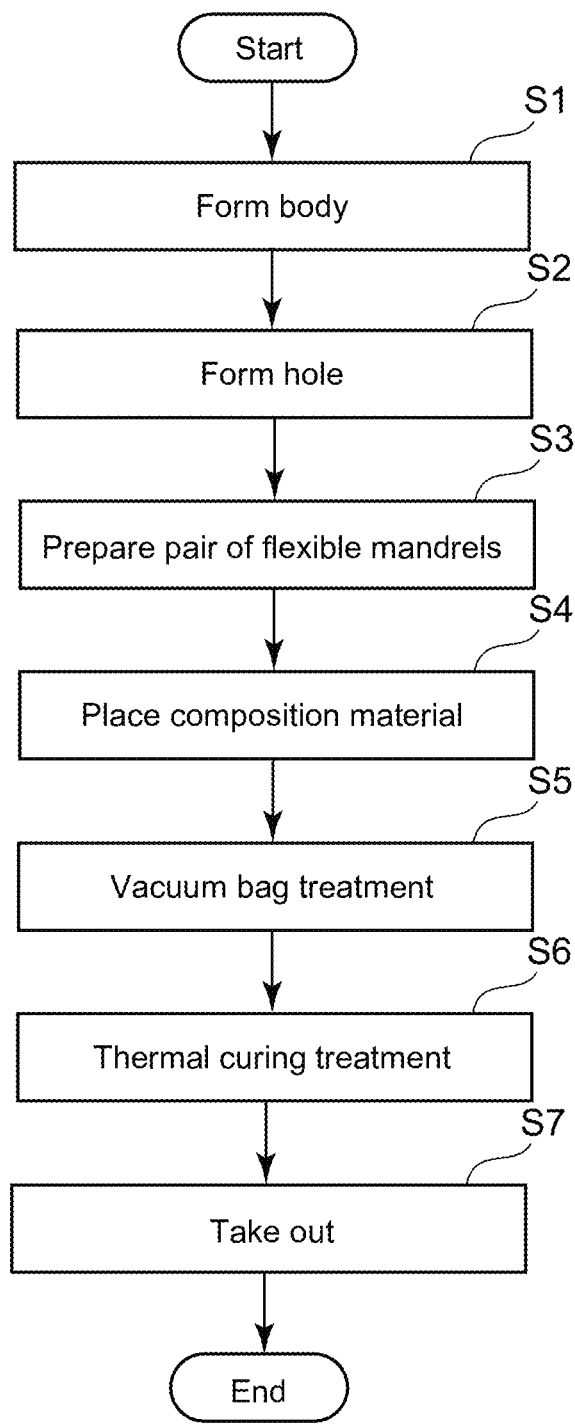
FIG. 5 is a flowchart of steps of a method of manufacturing a composite material part according to at least one embodiment of the present invention.

Next, a method of manufacturing the composite material part 2 with the flexible mandrel 1 having the above configuration will be described. FIG. 5 is a flowchart of steps of the method of manufacturing the composite material part 2 according to at least one embodiment of the present invention.

First, the body 3 of the flexible mandrel 1 is formed from a predetermined material (step S1). As described above, the material of the body 3 has a thermal conductivity capable of transferring heat supplied from the outside to the composite material part 2 during thermal curing treatment and a flexibility allowing the body 3 to transform in accordance with the designed shape of the composite material part 2. For instance, metal and composite materials may be used (CFRP, PAN-based CFRP is particularly preferable in terms of cost, and PITCH-based CFRP can also be used).

Such a body 3 is formed as a substantially rectangular solid bulk.

Then, at least one hole 8 is formed in the body 3 formed in step S1 (step S2). The hole 8 is formed by machining, for instance cutting, the bulk of the body 3. Although in the present embodiment, the hole 8 is formed after forming the bulk body 3, the hole 8 may be formed simultaneously when the body 3 is formed in step S1 (for instance, the body 3 and the hole 8 may be integrally formed).

The at least one hole 8 is formed in the non-contact surface 6 of the body 3 which does not come into contact with the composite material part 2. The hole 8 may be formed in the non-contact surface 6 except for a non-formation region 10 including an edge of the body 3. When a plurality of holes 8 is formed, the distribution may be uniform or non-uniform.

The hole 8 thus formed is filled with a filler 12, as needed. The filler 12 may include a material having a thermal conductivity higher than the body 3. For instance, metal foam such as aluminum foam can be used.

Then, the composite material part 2 is molded with the flexible mandrel 1 thus completed. A pair of the flexible mandrels 1 is prepared (step S3), and a composite material for forming the composite material part 2 is placed between the pair of flexible mandrels 1 (step S4). The composite material to be used may be, for instance, semi-cured flexible CFRP sheets which are combined in accordance with the shape of the composite material part 2.

Figure 6:
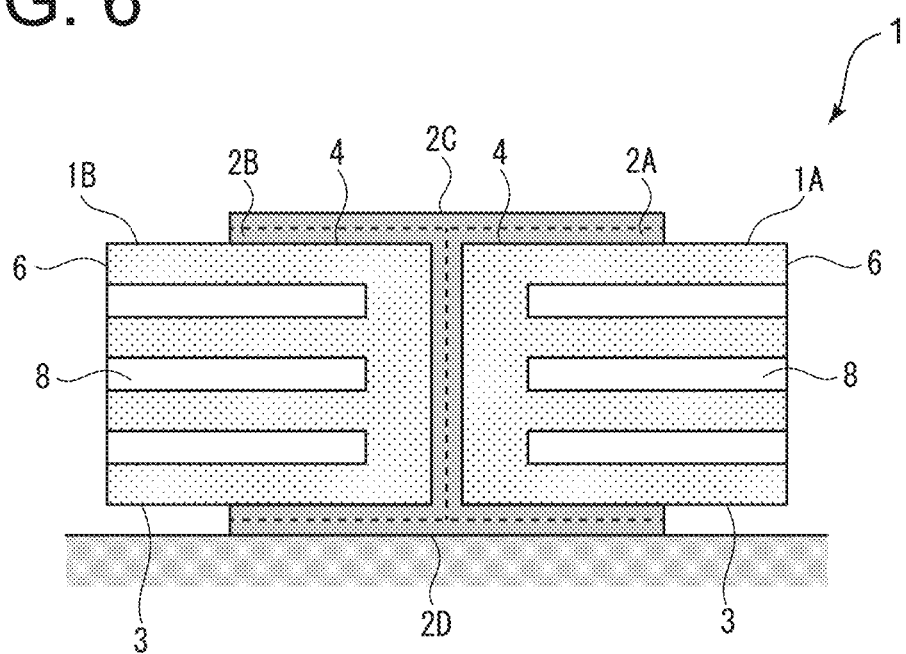
FIG. 6 is a schematic diagram showing combination pattern of CFRP sheets for molding a composite material part having a I-type cross-section.

FIG. 6 is a schematic diagram showing combination pattern of CFRP sheets for molding the composite material part 2 having a I-type cross-section. For molding the composite material part 2 having the I-type cross-section as shown in FIG. 1, for instance, a first sheet 2A covering the contact surface 4 of the first flexible mandrel 1A, a second sheet 2B covering the contact surface 4 of the second flexible mandrel 1B, a third sheet 2C covering the first sheet 2A and the second sheet 2B from above, and a fourth sheet 2D covering the first sheet 2A and the second sheet 2B from above are combined.

Then, while the composite material is placed between the pair of flexible mandrels 1, vacuum bag treatment is performed by covering the entire assembly with a bag material and eliminating air therein (step S5). In vacuum bag treatment, the bag material is somewhat drawn into the hole 8 formed in the body 3 due to negative pressure. However, when the hole 8 is filled with the filler 12 as in the second modification (FIG. 4), it is possible to effectively prevent the bag material being drawn into the hole 8 and damaged.

Then, while assembly is vacuum bagged, thermal curing treatment is performed on the pair of flexible mandrels 1 with the composite material placed therebetween (step S6). The thermal curing treatment is performed in an autoclave at high temperature and high pressure. When the atmosphere temperature in the autoclave rises, heat is transferred to the composite material via the flexible mandrels 1, so that the composite material is heated.

Figure 7:
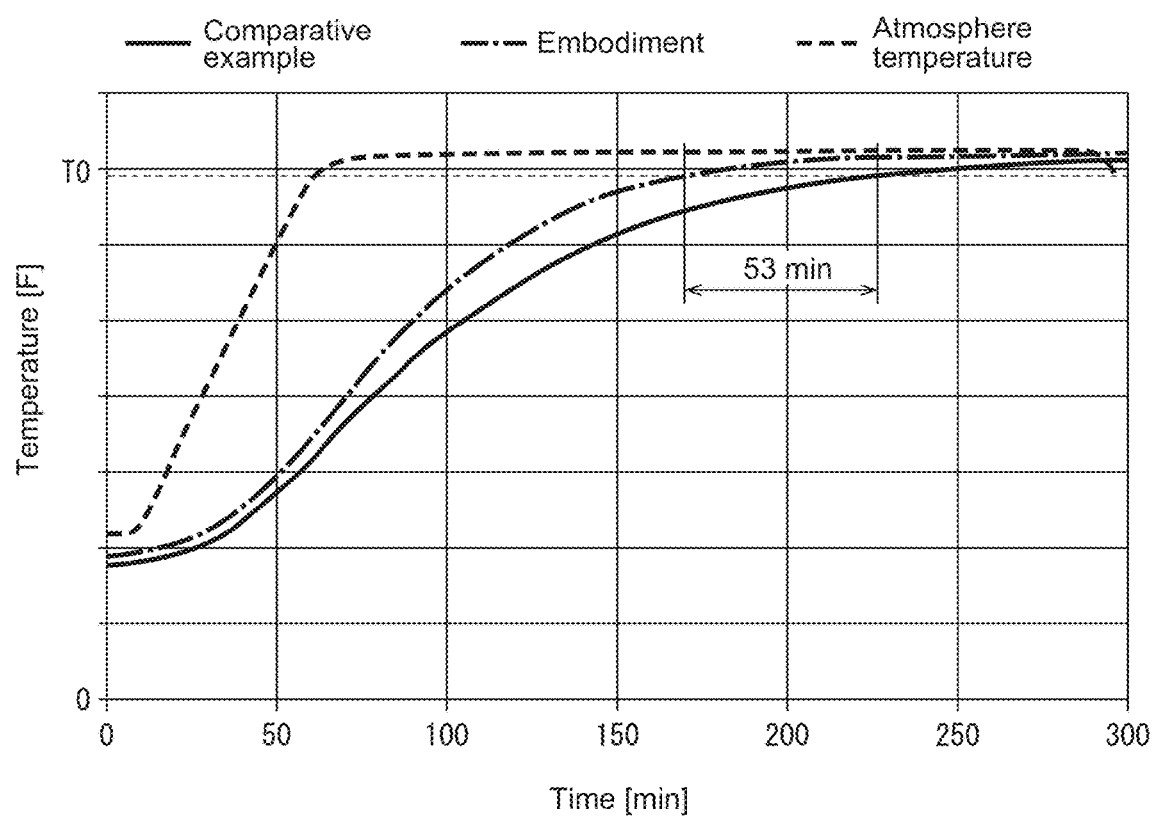
FIG. 7 is measurement result showing the time course of the temperature inside flexible mandrels and the atmosphere temperature in an autoclave in thermal curing treatment.

FIG. 7 is measurement result showing the time course of the temperature inside the flexible mandrels 1 and the atmosphere temperature in the autoclave in thermal curing treatment. In FIG. 7, the dotted line represents the atmosphere temperature in the autoclave. The atmosphere temperature gradually increases to target temperature T0 over time. With the change in the atmosphere temperature, the temperature inside the flexible mandrels 1 increases accordingly. Measurement result represented by the solid line is result of comparative example not having the hole 8 (same as the flexible mandrel 1 according to the present embodiment except for the absence of the hole 8), and measurement result represented by the alternate long and short dash line is result of the flexible mandrel 1 having the hole 8 according to the present embodiment. As shown in FIG. 7, in the present embodiment, the time for reaching the target temperature T0 was about 53 minutes earlier than comparative example. This indicates that the flexible mandrel 1 having the hole 8 according to the present embodiment has reduced heat capacity and thus can be more rapidly heated.

In thermal curing treatment of step S6, since the temperature is kept at the target temperature for a predetermined time, thermal curing of the composite material progresses, and the composite material part 2 is molded. After completion of thermal curing treatment, the bag material is removed, and the finished composite material part 2 is taken out from the inside (step S7).

As described above, according to at least one embodiment of the present invention, by forming the hole 8 in the body of the flexible mandrel 1, temperature rising for thermally curing the composite material containing a thermosetting resin is promoted. Thus, it is possible to achieve the improvement in part production rate and the reduction in cost.

INDUSTRIAL APPLICABILITY

At least one embodiment of the present invention can be applied to a flexible mandrel used for molding a composite material part including a composite material such as CFRP and a method of manufacturing a composite material part with the flexible mandrel.

REFERENCE SIGNS LIST

1 Flexible mandrel
2 Composite material part
3 Body
4 Contact surface
6 Non-contact surface
8 Hole
10 Non-formation region
12 Filler

The invention claimed is:
1. A flexible mandrel for molding a composite material containing a thermosetting resin, comprising:
   a body including a contact surface configured to come into contact with the composite material during molding and a non-contact surface configured not to come into contact with the composite material during molding;
   at least one hole formed from the non-contact surface toward an inside of the body; and
   a filler filled in the at least one hole.
2. The flexible mandrel according to claim 1,
   wherein the at least one hole is formed in a portion of the non-contact surface opposite to the contact surface.
3. The flexible mandrel according to claim 1,
   wherein the at least one hole includes a plurality of holes uniformly formed in at least one region on the non-contact surface.
4. The flexible mandrel according to claim 1,
   wherein the at least one hole includes a plurality of holes non-uniformly formed in at least one region on the non-contact surface.

5. The flexible mandrel according to claim 1,
wherein the at least one hole is formed in the non-contact surface except for a non-formation region including an edge.

6. The flexible mandrel according to claim 5,
wherein the non-formation region has a thickness of 10% or more of a total thickness of the non-contact surface in a thickness direction along a plane perpendicular to a longitudinal direction of a composite material part made of the composite material.

7. The flexible mandrel according to claim 1,
wherein the at least one hole is a bottomed hole having a depth of 60% to 90% of a distance between the contact surface and the non-contact surface.

8. The flexible mandrel according to claim 1,
wherein the filler has a thermal conductivity higher than the body.

9. The flexible mandrel according to claim 1,
wherein the filler is a metal foam.

10. A method of manufacturing a composite material part by molding a composite material containing a thermosetting resin with a pair of flexible mandrels, the method comprising:
 a step of forming a body of each flexible mandrel including a contact surface configured to come into contact with the composite material and a non-contact surface configured not to come into contact with the composite material;
 a step of forming at least one hole in the non-contact surface of the body toward an inside of the body; and
 a step of placing the composite material between the pair of flexible mandrels having the at least one hole and subjecting the composite material to thermal curing treatment,
wherein the at least one hole is filled with a filler.

* * * * *